United States Patent
Hidaka et al.

(10) Patent No.: US 7,630,988 B2
(45) Date of Patent: Dec. 8, 2009

(54) COMPUTER PRODUCT AND SESSION MANAGEMENT METHOD

(75) Inventors: Kouichi Hidaka, Kawasaki (JP); Shinya Suematsu, Kawasaki (JP); Tokio Nakayama, Toyama (JP); Nobuyuki Kozakura, Toyama (JP)

(73) Assignee: Fujitsu Limited, Kawasaki (JP)

( * ) Notice: Subject to any disclaimer, the term of this patent is extended or adjusted under 35 U.S.C. 154(b) by 372 days.

(21) Appl. No.: 11/475,832

(22) Filed: Jun. 27, 2006

(65) Prior Publication Data

US 2007/0214165 A1  Sep. 13, 2007

(30) Foreign Application Priority Data

Mar. 13, 2006 (JP) .............................. 2006-068228

(51) Int. Cl.
*G06F 7/00* (2006.01)
*G06F 17/30* (2006.01)
*G06F 15/16* (2006.01)

(52) U.S. Cl. .......................... 707/10; 709/227; 709/217

(58) Field of Classification Search ................. 709/203, 709/227, 228, 218, 217; 707/10, 1
See application file for complete search history.

(56) References Cited

U.S. PATENT DOCUMENTS

| 6,691,118 | B1* | 2/2004 | Gongwer et al. ............ 707/100 |
| 6,883,015 | B1* | 4/2005 | Geen et al. .................. 709/203 |
| 7,171,478 | B2* | 1/2007 | Lueckhoff et al. .......... 709/227 |
| 7,299,269 | B2* | 11/2007 | Elving ......................... 709/218 |
| 2004/0083292 | A1* | 4/2004 | Lueckhoff et al. .......... 709/227 |
| 2006/0282509 | A1* | 12/2006 | Kilian et al. ................ 709/217 |

FOREIGN PATENT DOCUMENTS

| JP | 9-508742 | 9/1997 |
| WO | WO 96/41258 | 12/1996 |

\* cited by examiner

*Primary Examiner*—Hung T Vy
(74) *Attorney, Agent, or Firm*—Fujitsu Patent Center

(57) ABSTRACT

When a request not yet recognized as belonging to a session sent to a server application written in a non-object-oriented language is received, a session identification data is affixed to the request, and a server instance is created, associating it with a thread shared with the server application. The server application that includes a predetermined function is called. The session management data is retrieved and kept in a variable in the server instance. When the request containing the session identification data is received, the session management data is set in the thread.

5 Claims, 7 Drawing Sheets

| KEY | VALUE |
|-----|-------|
|     |       |

FIG.5

```
//INSTANCE OF SERVER APPLICATION WRITTEN IN C
void op01() { int new_count;
  int old_count;

//RETRIEVE DATA SET IN PREVIOUS REQUEST
  old_count = getSessionInfo ("COUNT");
  new_count = old_count+1;

//SET NEW SESSION MANAGEMENT DATA
  setSessionInfo("COUNT", new_count);

return;
}
```

COMPUTER PRODUCT AND SESSION MANAGEMENT METHOD

BACKGROUND OF THE INVENTION

1. Field of the Invention

The present invention generally relates to a technology for deploying an application written in non-object-oriented languages on an open platform.

2. Description of the Related Art

There have been attempts to deploy old (legacy) systems that are running in mainframe or office computer on an open system. Specifically, attempts have been made to deploy applications written in non-object-oriented languages such as C or COBOL on open platforms such as Windows (registered trademark), Linux, UNIX (registered trademark), and the like, and to run them at the same functional level as applications on an open system, which are based on Java (registered trademark) 2 Enterprise Edition (J2EE).

The functional level mentioned above refers to the essential session management function in particular. For example, let us consider a case of a server application being accessed by a client application for a request using HyperText Transfer Protocol (HTTP). HTTP ends a session after each request, and is therefore unable to treat a plurality of requests as one session and as a result unable to share data between the plurality of requests occurring in one session. On the contrary, J2EE implements SessionBean, which is a component of a program (Bean) and which treats a plurality of requests as a single session and enables sharing of data between a plurality of requests occurring in a single session.

A method is disclosed in Japanese Patent Laid-Open Publication No. H9-508742 in which a business application written in a non-object-oriented language is deployed on an open platform and the session management function is implemented by redefining separately an independent object that signifies an actual or a conceptual meaning pertaining to a business, and by interposing the object in communication.

However, in the conventional technology, the workload on the application developers increases every time an application written in a non-object-oriented language is deployed on an open platform and the session management function is implemented. In other words, the application developers must separately redefine the object signifying the actual or conceptual meaning of the business in the business application written in the non-object-oriented language, as well as redefine the attributes of the object, including input parameters and output parameters of the business application. As a result, every time an application written in a non-object-oriented language is deployed on an open platform and the session management function is implemented, the application developers must define an object in the server application, thus increasing their workload.

Thus, there is a need of a technology for deploying an application written in an object-oriented language on an open platform and also realize session management function without putting much burden on the developers.

SUMMARY OF THE INVENTION

It is an object of the present invention to at least partially solve the problems in the conventional technology.

According to an aspect of the present invention, a session management method of sharing session management data between a plurality of requests made in one session by a client application to a server application written in a non-object-oriented language includes server instance creation wherein when the request not yet recognized as belonging to a session is received, a session identification data is affixed to the request so that the request can be recognized as belonging to a session, and a server instance that is associated with a thread shared with the server application is created; first calling wherein when the server instance is created at the server instance creation step, the server application that includes a first predetermined function and a second predetermined function from the server instance, the first predetermined function being a function that sets the session management data in the shared thread and the second predetermined function being a function that retrieves the session management data from the shared thread; session management data keeping wherein when a process of the server application called at the first calling step ends, the session management data set in the thread by the server application is retrieved and kept in a variable in the server instance; session management data setting wherein when the request containing the session identification data is received, the server instance corresponding to the session identification data is searched for, and the session management data kept in the variable in the server instance at the session management data keeping step is set in the thread; and second calling wherein when the session management data is set in the thread at the session management data setting step, the server application is called from the server instance.

According to another aspect of the present invention, a session management apparatus that shares session management data between a plurality of requests made in one session by a client application to a server application written in a non-object-oriented language includes a server-instance creating unit that affixes a session identification data to the request not yet recognized as belonging to a session so that the request can be recognized as belonging to a session, and creates a server instance, associating the server instance with a thread shared with the server application; a first calling unit that calls the server application that includes a first predetermined function and a second predetermined function from the server instance when the server instance is created by the server-instance creating unit, the first predetermined function being a function that sets the session management data in the shared thread and the second predetermined function being a function that retrieves the session management data from the shared thread; a session-management-data keeping unit that retrieves the session management data set in the thread by the server application and keeps the retrieved session management data in a variable in the server instance when a process of the server application called by the first calling unit ends; a session-management-data setting unit that searches for the server instance corresponding to the session identification data when the request containing the session identification data is received, and sets in the thread the session management data kept in the variable in the server instance by the session-management-data keeping unit; and a second calling unit that calls the server application from the server instance when the session management data is set in the thread by the session-management-data setting unit.

According to still another aspect of the present invention, a computer-readable recording medium stores therein a computer program that causes a computer to implement the above method.

The above and other objects, features, advantages and technical and industrial significance of this invention will be better understood by reading the following detailed descrip-

DETAILED DESCRIPTION OF THE PREFERRED EMBODIMENTS

Exemplary embodiments of the present invention are explained next with reference to the accompanying drawing.

Important terms used in an embodiment of the present invention are described in the section "Terms used". The overview and the salient feature of a session management apparatus according to a first embodiment of the present invention are described in the section "Overview and salient feature of session management apparatus". The configuration and process flow of the session management apparatus are described in the section "Configuration and processes of session management apparatus". Finally, the effects due to the first embodiment are described in the section "Effects due to first embodiment".

Important terms used in the present embodiment are explained next. The term "non-object-oriented language" (corresponding to "non-object-oriented language" mentioned in the claims) refers to any procedural programming language other than an object-oriented language. Specifically, the term non-object-oriented language refers to programming languages such as C, COBOL, etc. Since their advent, such non-object-oriented languages have been used as a central development language of the system that run on mainframe or office computers. For example, it is common to write server applications (corresponding to "server application" mentioned in the claims) of core systems such as personnel system, accounting system, etc. of a business in a non-object-oriented language such as C and COBOL.

The term "session" (corresponding to "session" mentioned in the claims) is a unit of the number of times the server application is accessed. A series of requests (corresponding to "request" mentioned in the claims) made by a client application to the server application corresponds to one session. Specifically, a server application providing an e-commerce service treats a login request followed by a request to "Place 3 Nos. of product having Product No. XX in the shopping cart", and all other requests in between till a request to settle the account as a single session. The server application allows sharing of data between the plurality of requests made in a single session. The term "session management" (corresponding to "session management" mentioned in the claims) refers to the implementation of sharing of data between the plurality of requests made during one session. The term "session management data" (corresponding to "session management data" mentioned in claims) refers to the data (such as "Product No. XX", "3", etc.) to be shared in the session management.

Figure 1:
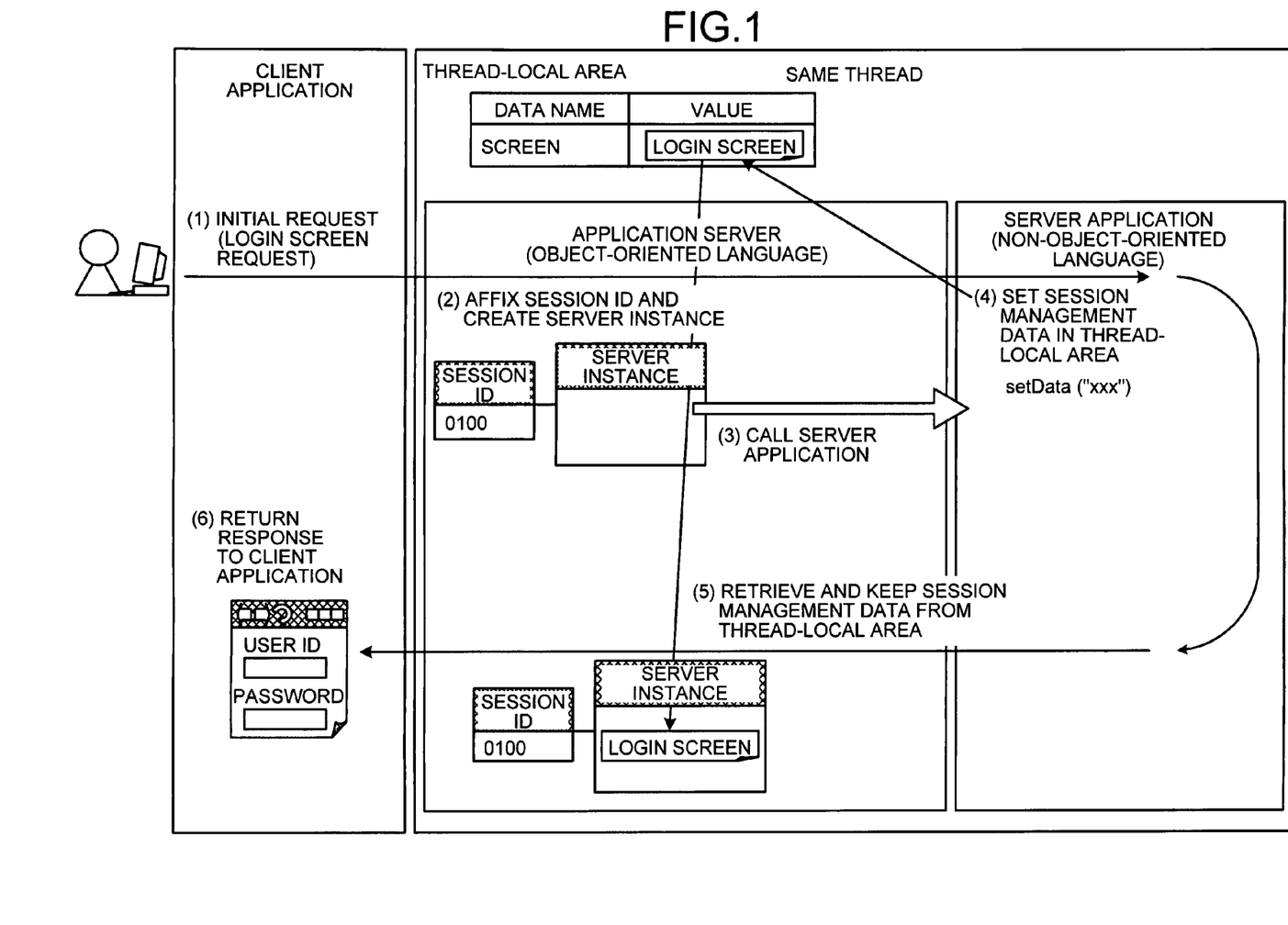
FIG. 1 is a schematic for explaining an overview and salient features of a session management apparatus according to a first embodiment of the present invention.
Figure 2:
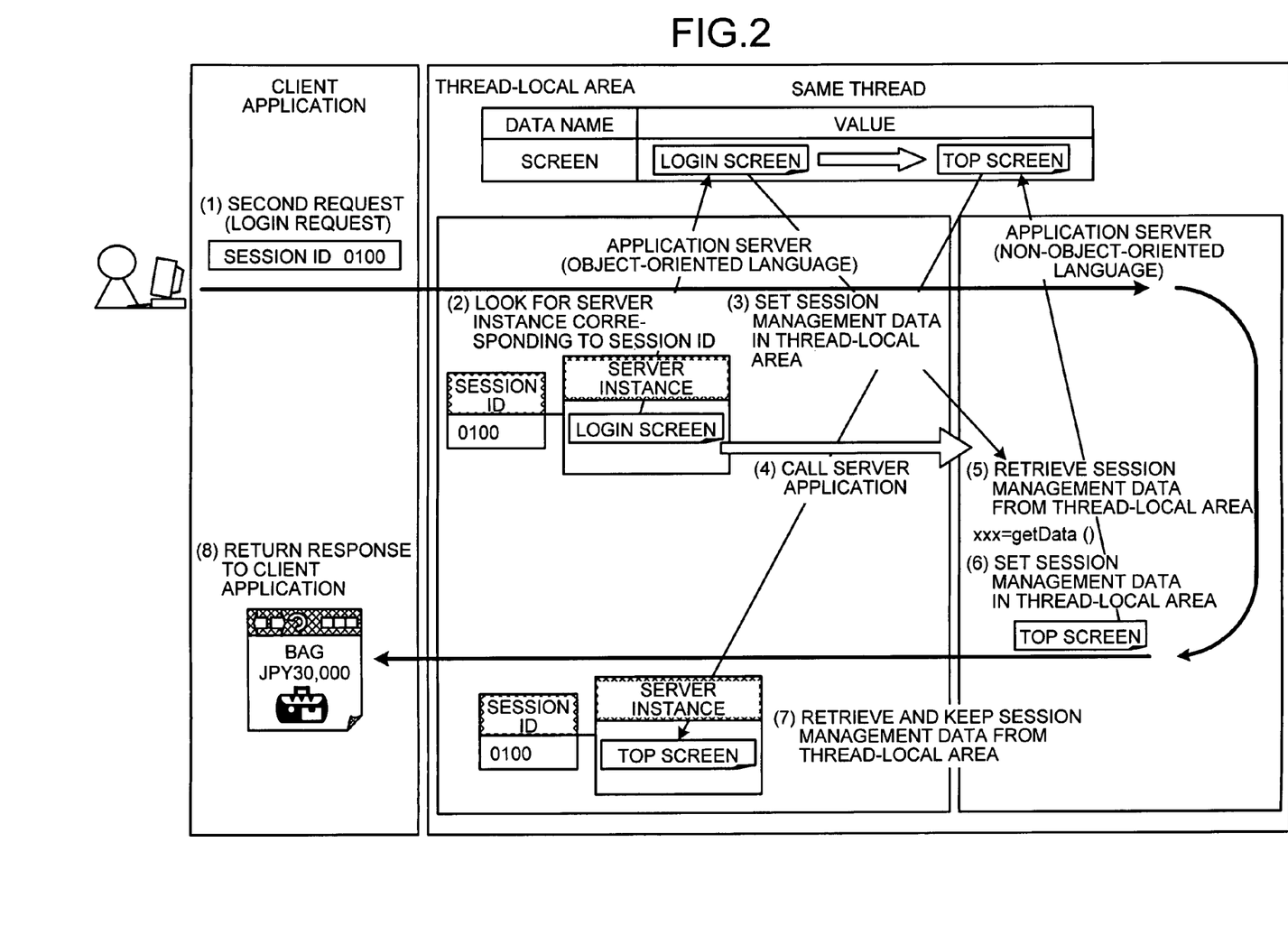
FIG. 2 is another schematic for explaining the overview and salient feature of the session management apparatus according to the first embodiment.

The overview and salient feature of the session management apparatus according to the first embodiment are explained next with reference to FIG. 1 and FIG. 2. FIG. 1 and FIG. 2 are schematics for explaining the overview and salient feature of the session management apparatus according to the first embodiment.

The session management apparatus according to the first embodiment recognizes a plurality of requests sent from the client application to the server application written in a non-object-oriented language as belonging to a session and allows data to be shared between the plurality of requests made during the same session. The salient feature of the session management apparatus according to the first embodiment is that it cuts down the workload of the application developer every time an application written in a non-object-oriented language is deployed on an open platform and the session management function is implemented.

As shown in FIG. 1, in the session management apparatus according to the first embodiment, an application server (a middleware that includes the session management function) written in an object-oriented language and the server application written in a non-object-oriented language are located in the same hardware. Further, in the session management apparatus according to the first embodiment, an Application Program Interface (API) described in a later section is disclosed in the server application, and the server application includes a function provided by the API.

The session management apparatus according to the first embodiment receives a request sent from the client application to the server application written in the non-object-oriented language (see (1) of FIG. 1). For example, as shown in FIG. 1, the session management apparatus receives a request for a login screen sent from the client application to the server application. Normally, such a request is considered as a start of a session. However, in the first embodiment, the request for a login screen is not yet recognized as belonging to a session.

Upon receiving the request that is not yet recognized as belonging to a session, the session management apparatus affixes a session identification data so that the request can be recognized as belonging to a session, and creates a server instance (corresponding to "instance" mentioned in the claims), associating it with the server application shared with the thread (see (2) of FIG. 1). For example, the session management apparatus creates a server instance by affixing a session identification data of "0100". The term "instance" refers to a type of object described in an object-oriented language. If the generic type of the object is class, the object created based on the definition of the class and having a specific value is called an instance.

When the server instance is created, the session management apparatus calls the server application from the server instance (see (3) of FIG. 1). The server application includes a designated function that sets a session management data in a thread-local area and a designated function that retrieves the session management data from the thread-local area. Designated function refers to the function provided by the API of the server application of the session management apparatus according to the first embodiment and is a function that sets the session management data in the thread or retrieves the session management data from the thread.

As the function that sets the session management data in the thread-local area is included in the server application called by the session management apparatus, the server application sets the session management data in the thread-local area according to the process of the function (see (4) of FIG. 1). For the sake of convenience, the data name of the session management data is set as "screen", and its value as "login screen" in FIG. 1. However, in actuality, the data name defined in the program and a numerical value are set as session management data.

When the process of the server application called by the session management apparatus ends, the session management apparatus according to the first embodiment retrieves the session management data from the thread-local area, and keeps the session management data in a variable in the server instance (see (5) of FIG. 1). The server application then returns a response to the client application (see (6) of FIG. 1), ending the initial request from the client application.

Next, the session management apparatus receives the request containing the session identification data, sent from the client application to the server application written in the non-object-oriented language (see (1) of FIG. 2). For example, as shown in FIG. 1, the session management apparatus receives the request for the login request containing therein the session identification data "0100", sent from the client application to the server application.

Upon receiving the request containing the session identification data, the session management apparatus searches for the server instance corresponding to the session identification data "0100" included in the request (see (2) of FIG. 2), and sets the session management data that is kept in the variable in the server instance in the thread (see (3) FIG. 2). As the session management data "login screen" is kept in the variable in the server instance in the first embodiment, this value is set in the thread.

Once the session management data is set in the local-thread area, the session management apparatus once again calls the server application from the server instance (see (4) of FIG. 2). As the server application called by the session management apparatus includes the function that retrieves the session management data from the thread-local area, the server application retrieves the session management data from the thread-local area according to the process of the function (see (5) of FIG. 2). For example, as "login screen" is set in the thread-local area by the session management apparatus in the first embodiment, the server application retrieves the session management data "login screen".

As the function that sets the session management data in the thread-local area is included in the server application, the server application sets the session management data in the thread-local area according to the process of the function (see (6) of FIG. 2). In the first embodiment, the server application sets the session management data "top screen" for proceeding to the next process.

When the process of the server application called by the session management apparatus ends, the session management apparatus according to the first embodiment retrieves the session management data from the thread-local area and keeps the session management data in the variable in the server instance (see (7) of FIG. 2). The server application then returns a response to the client application (see (8) of FIG. 2), ending the second request from the client application.

Thus, as compared with the conventional method where the application developer must define an object for every server application based on specifications of the server application, the session management apparatus according to the first embodiment cuts down the workload of the application developer every time an application written in a non-object-oriented language is deployed on an open platform, and the session management function is implemented.

Figure 3:
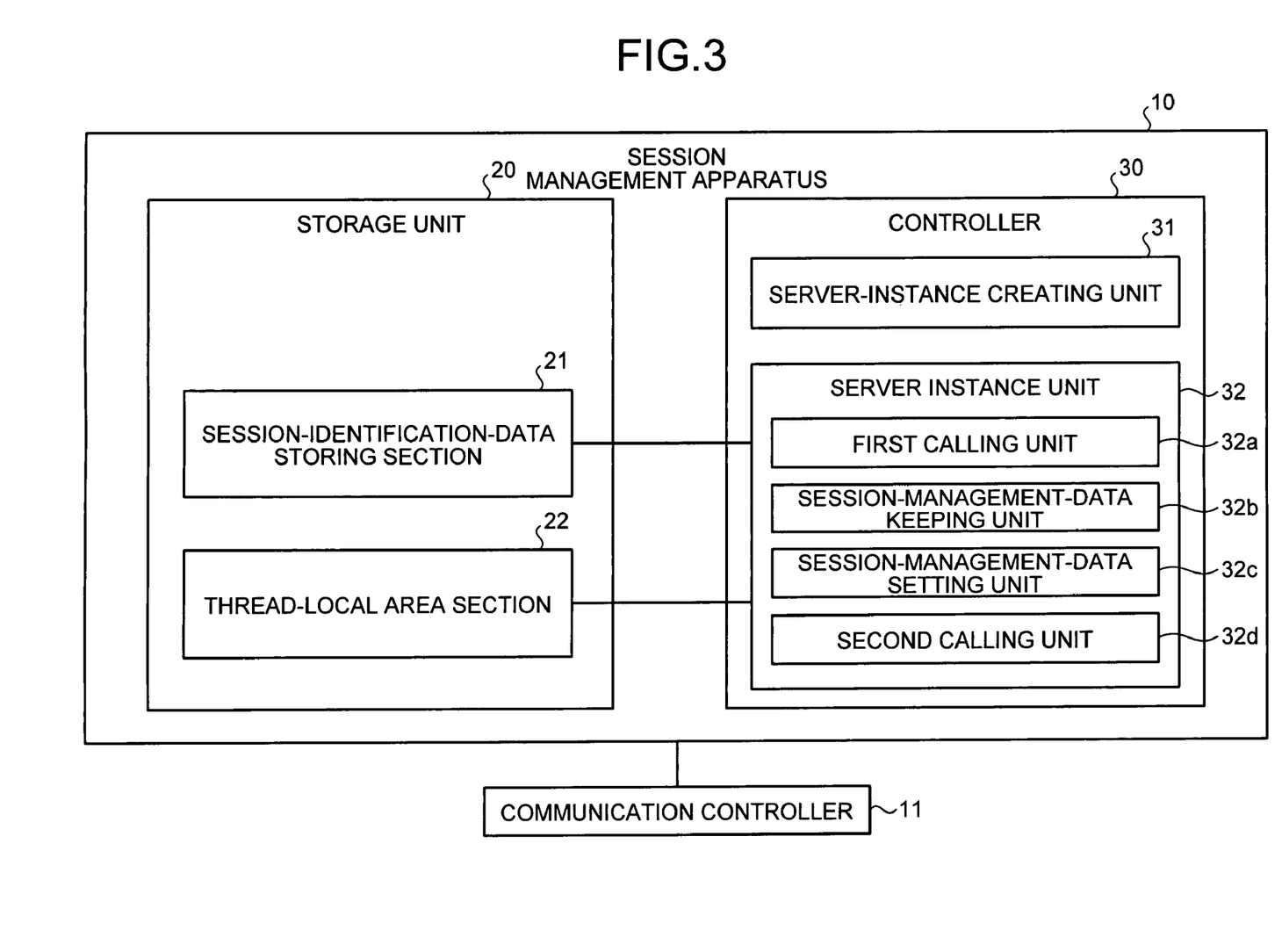
FIG. 3 is a detailed function block diagram of the session management apparatus according to the first embodiment.
Figure 4:
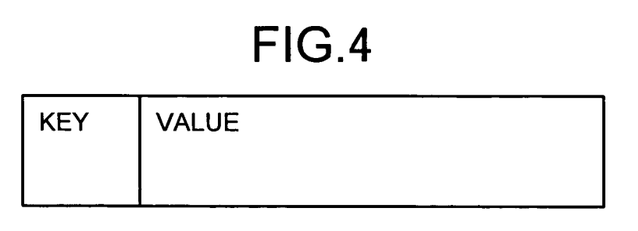
FIG. 4 is a schematic for explaining a thread-local area.
Figure 5:
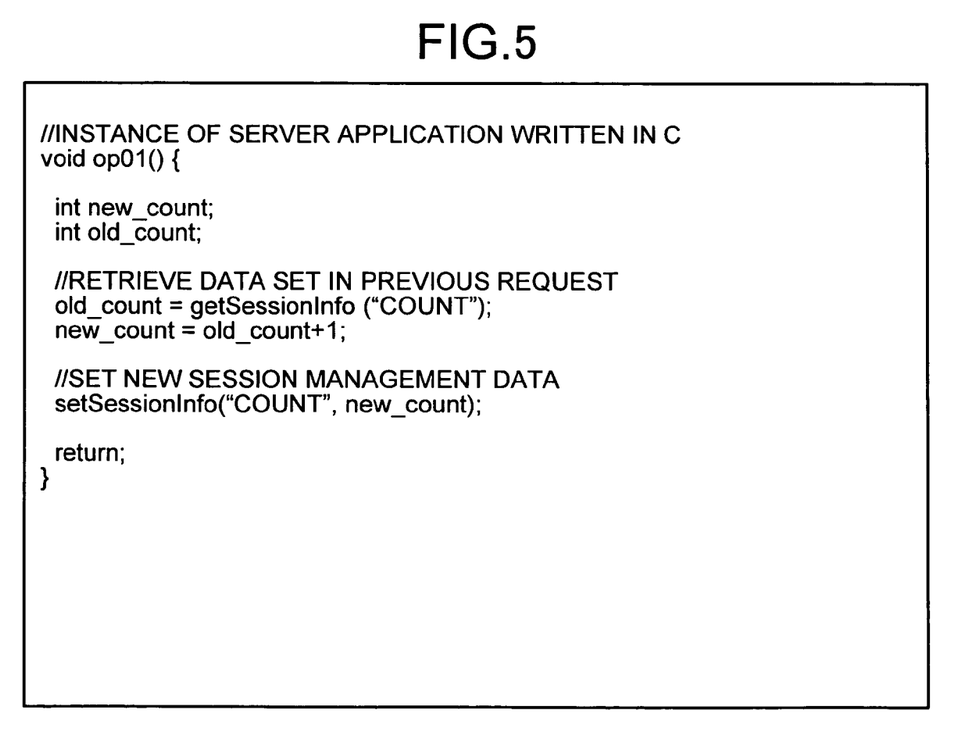
FIG. 5 is a schematic for explaining an API disclosed in a server application.

The configuration of the session management apparatus according to the first embodiment is explained next with reference to FIG. 3. FIG. 3 is a block diagram of the session management apparatus according to the first embodiment. FIG. 4 is a schematic for explaining the thread-local area. FIG. 5 is a schematic for explaining an API disclosed in the server application.

As shown in FIG. 3, a session management apparatus 10 includes a communication controller 11, a storage unit 20, and a controller 30.

The communication controller 11 implements communication by enabling the session management apparatus 10 to communicate over a network with the client application and other devices connected to the network so that the session management apparatus 10 and the client application and other devices can access one another. Specifically, the communication controller 11 implements communication by a Local Area Network (LAN) board built into the personal computer. For example, the communication controller 11 implements communication by accessing the other devices on the network, and receiving requests sent from the client application to the server application written in the non-object-oriented language and located in the session management apparatus 10.

The storage unit 20 stores therein data required for various processes carried out by the controller 30. In close relevance to the present invention, the storage unit 20 includes a session-identification-data storing section 21 and a thread-local area section 22, as shown in FIG. 3.

The session-identification-data storing section 21 of the storage unit 20 stores therein the session identification data to recognize requests as sessions. Specifically, if a request that is not yet recognized as belonging to a session is received by the session management apparatus 10, a server-instance creating unit 31 described later affixes a session identification data to the request so that the request can be recognized as belonging to a session, and creates a server instance of the server application. The session-identification-data storing section 21 stores the session identification data. If a request that is recognized as belonging to a session and includes the session identification data is received by the session management apparatus 10, the session management apparatus 10 searches for the server instance that includes the session management data the request contains. The session-identification-data storing section 21 stores therein the session identification data that is searched. The session-identification-data storing section 21, for instance, stores therein "0100" as the session identification data.

The thread-local area section 22 is a storage area, which the session management apparatus 10 shares with the server application located in the session management apparatus 10. Specifically, when a request not yet recognized as belonging to a session is received by the session management apparatus 10, the server-instance creating unit 31 described later creates a server instance, associating it with the thread shared with the server application. The thread-local area section 22 is the shared thread that is associated with the server instance. The thread-local area section 22 stores therein the session management data set by the predetermined function included in the server application and the session management data retrieved by the predetermined function included in the server application. When the process of the server application called by a first calling unit 32a described later ends, the session management data stored in the thread-local area section 22 is retrieved by a session-management-data keeping unit 32*b* described later and kept in the variable in the server instance. When the request containing the session identification data is received by the session management apparatus 10, the thread-local area section 22 stores therein the session management data set by a session-management-data setting unit 32*c* described later.

As shown in FIG. 4, the storage area in the thread-local area section 22 is segregated into two types of data, namely key and value. In the first embodiment, "screen" is presented as an example of key data, and "login screen" and "top screen" are presented as examples of value data. Any data that is defined as key and value in the program and that is used for session management can be stored.

Returning to FIG. 3, the controller 30 performs various processes and controls the session management apparatus 10. In close relevance to the present invention, the controller 30 includes the server-instance creating unit 31 and a server instance unit 32, as shown in FIG. 3.

The server-instance creating unit 31 of the controller 30 creates the server instance. Specifically, when a request not yet recognized as belonging to a session is received by the session management apparatus 10, the server-instance creating unit 31 affixes the session identification data to the request so that the request can be recognized as belonging to a session as well as creates the server instance, associating it with the thread-local area section 22 shared with the server application. The server-instance creating unit 31 corresponds to "server-instance creating unit" mentioned in the claims.

The server instance unit 32 is an instance unit that keeps the session management data retrieved from the thread-local area section 22 and sets the retained session management data back in the thread-local area section 22. As shown in FIG. 3, the server instance unit 32 includes the first calling unit 32*a*, the session-management-data keeping unit 32*b*, the session-management-data setting unit 32*c*, and a second calling unit 32*d*. The first calling unit 32*a* corresponds to "first calling unit" mentioned in the claims, the session-management-data keeping unit 32*b* corresponds to "session-management-data keeping unit" mentioned in the claims, the session-management-data setting unit 32*c* corresponds to "session-management-data setting unit" mentioned in the claims, and the second calling unit 32*d* corresponds to "second calling unit" mentioned in the claims.

The first calling unit 32*a* of the server instance unit 32 calls the server application. Specifically, when the server-instance creating unit 31 creates the server instance, the first calling unit calls the server application that includes the predetermined function that sets the session management data in the thread-local area section 22 and the predetermined function that retrieves the session management data from the thread-local area section 22.

The session-management-data keeping unit 32*b* keeps the session management data in the variable in the server instance. Specifically, when the process of the server application called by the first calling unit 32*a* ends, the session-management-data keeping unit 32*b* retrieves the session management data from the thread-local area section 22 and keeps it in the variable in the server instance.

The session-management-data setting unit 32*c* sets the session management data in the thread. Specifically, when a request to which the session identification data is affixed and that is recognized as belonging to a session is received by the session management apparatus 10, the session-management-data setting unit 32*c* sets in the thread-local area section 22 the session management data that is kept in the variable in the server instance by the session-management-data keeping unit 32*b*.

The second calling unit 32*d* calls the server application. Specifically, when the session management data is set in the thread-local area section 22 by the session-management-data setting unit 32*c*, the second calling unit 32*d* calls the server application.

FIG. 5 is a schematic for explaining the functions provided by the API disclosed in the server application located in the session management apparatus 10. For example, "old_count=getSessionInfo("COUNT");" denotes a predetermined function by which the server application retrieves the session management data from the thread-local area section 22. "SetSessionInfo("COUNT", new_count);" denotes a predetermined function by which the server application sets the session management data in the thread-local area section 22. The functions provided by the API shown in FIG. 5 are written in C. However, the functions may be written in any language as long as it is in agreement with the programming language of the server application located in the session management apparatus 10.

Figure 6:
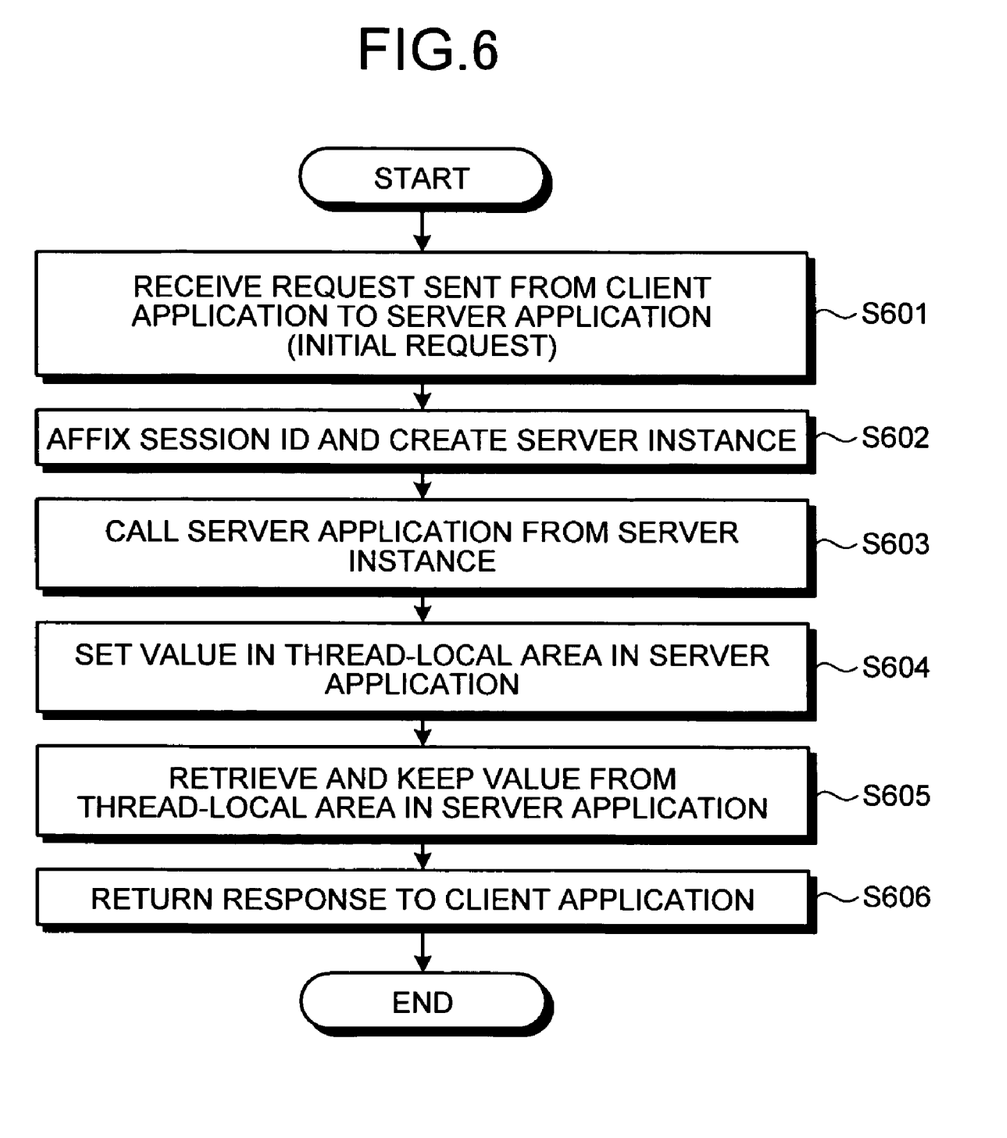
FIG. 6 is a flowchart of a session management process in the first embodiment.
Figure 7:
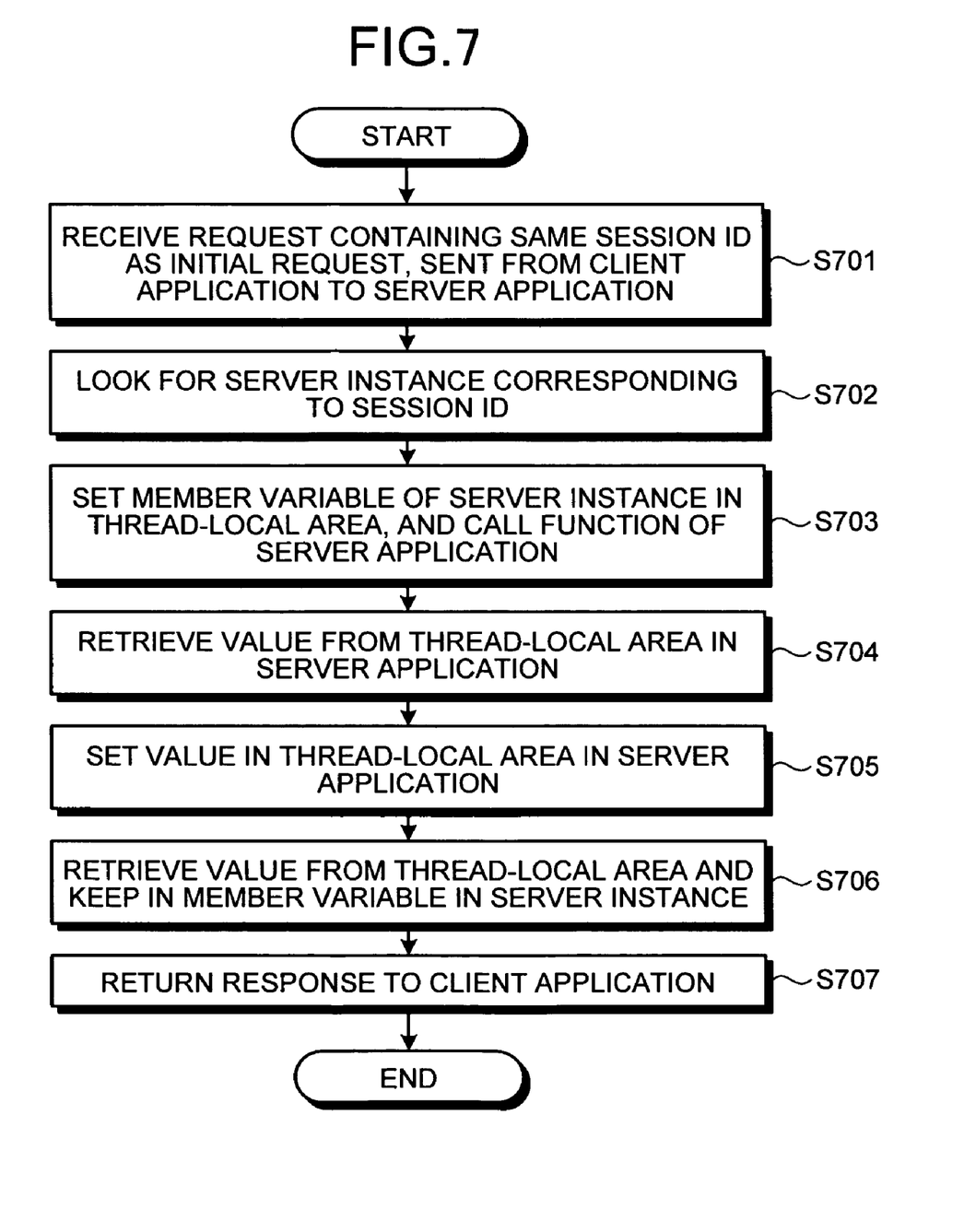
FIG. 7 is a flowchart of the session management process in the first embodiment.

The procedure of a session management process in the first embodiment is explained next with reference to FIG. 6 and FIG. 7. FIG. 6 and FIG. 7 are flowcharts of the session management process in the first embodiment.

As shown in FIG. 6, the session management apparatus 10 receives a request not yet recognized as belonging to a session, sent from the client application to the server application written in the non-object-oriented language (step S601).

The server-instance creating unit 31 of the session management apparatus 10 affixes the session identification data so that the request can be recognized as belonging to a session as well as creates the server instance, associating it with the thread-local area section 22 shared with the server application (step S602).

The session management apparatus 10 then calls from the server instance unit 32 the predetermined function that sets the session management data in the shared thread-local area section 22 and the predetermined function that retrieves the session management data from the shared thread-local area section 22 (step S603).

The session management data is set in the shared thread-local area section 22 in the server application called by the server instance unit 32 (step S604).

When the process of the server application ends, the session management apparatus 10 retrieves the session management data from the shared thread-local area section 22 and keeps it in a member variable in the server instance unit 32 (step S605).

The session management apparatus 10 then returns a response to the application (step S606).

Next, as shown in FIG. 7, the session management apparatus 10 receives the request to which the session identification data is affixed and which is recognized as belonging to a session, sent from the client application to the server application written in the non-object-oriented language (step S701).

The session management apparatus 10 then searches for the server instance unit 32 corresponding to the session identification data, sets the session management data kept in the server instance unit 32 in the thread-local area section 22, and calls the server application from the server instance unit 32 (step S703).

The session management data is retrieved from the shared thread-local area section 22 in the server application called by the server instance unit 32 (step S704).

The session management data is set in the shared thread-local area section 22 in the server application (step S705).

When the process of the server application ends, the session management apparatus 10 retrieves the session management data from the shared thread-local area section 22 and keeps it in the member variable in the server instance (step S706).

Next, the session management apparatus 10 returns a response to the client application (step S707).

Thus, according to the first embodiment, when a request that is not yet recognized as belonging to a session is received, the session management apparatus according to the present embodiment affixes a session identification data to the request so that the request can be recognized as belonging to a session and creates a server instance, associating it with the thread shared with the server application. Once the server instance is created, the session management apparatus calls the server application, which includes a predetermined function that sets the session management data in the shared thread and a predetermined function that retrieves the session management data from the shared thread, from the server instance. When the process of the called server application ends, the session management apparatus retrieves the session management data set by the server application from the thread, and keeps in a variable in the server instance. Upon receiving the request containing the session identification data, the session management apparatus searches for the server instance corresponding to the session identification data, and sets the session management data kept in the server instance in the thread, and calls the server application from the server instance. Consequently, as compared to the method where the application developer must define an object for every server application based on specifications of the server application, the workload of the application developer is cut down every time an application written in a non-object-oriented language is deployed on an open platform and the session management function is implemented.

According to the first embodiment, the server instance that is created is associated with a thread-local area, which is the thread shared with the server application, preventing other sessions from referring to the server instance.

Other embodiments are explained next as a session management apparatus according to a second embodiment.

In the first embodiment, the thread-local area was used as the thread shared with the server application. However, global area can also be used as the thread shared with the server application.

Figure 8:
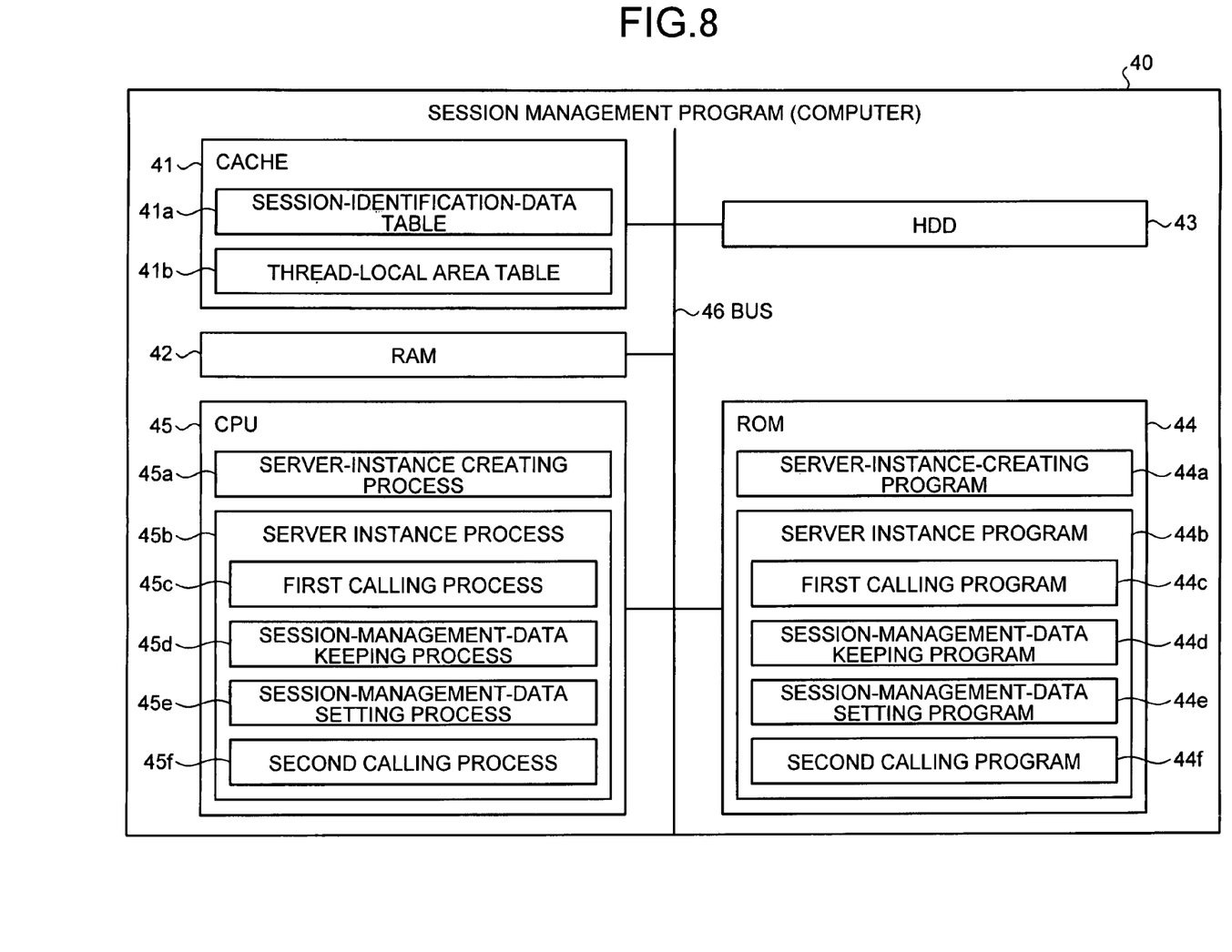
FIG. 8 is a block diagram of a computer that implements the methods, steps, processes by executing a session management program.

The various processes explained in the first embodiment can be realized by making a computer, such as a personal computer or a workstation, execute a ready computer program. A computer that executes a session management program that includes the same functions as described in the first embodiment is explained next with reference to FIG. 8. FIG. 8 is a block diagram of a computer that executes the session management program.

A session management program (computer) 40 includes a cache 41, a random access memory (RAM) 42, a hard disk drive (HDD) 43, read-only memory (ROM) 44, and a central processing unit (CPU) 45, all of which are connected to each other by a bus 46. A server-instance creating program 44a and a server instance program 44b that perform the functions described in the first embodiment are already stored The ROM 44. The server instance program 44b includes a first calling program 44c, a session-management-data keeping program 44d, a session-management-data setting program 44e, and a second calling program 44f.

The CPU 45 executes a server-instance creating process 45a, a server instance process 45b, a first calling process 45c, a session-management-data keeping process 45d, a session-management-data setting process 45e, and a second calling process 45f by executing the server-instance creating program 44a, the server instance program 44b, the first calling program 44c, the session-management-data keeping program 44d, the session-management-data setting program 44e, and the second calling program 44f, respectively. The server-instance creating process 45a, the server instance process 45b, the first calling process 45c, the session-management-data keeping process 45d, the session-management-data setting process 45e, and the second calling process 45f correspond, respectively, to the server-instance creating unit 31, the server instance unit 32, the first calling unit 32a, the session-management-data keeping unit 32b, the session-management-data setting unit 32c, and the second calling unit 32d shown in FIG. 3.

The cache 41 contains a session-identification-data table 41a and a thread-local area table 41b. The session-identification-data table 41a and the thread-local area table 41b correspond, respectively, to the session-identification-data storing section 21 and the thread-local area section 22 shown in FIG. 3.

Apart from the ROM 44, the server-instance creating program 44a, the server instance program 44b, the first calling program 44c, the session-management-data keeping program 44d, the session-management-data setting program 44e, and the second calling program 44f can also be stored on any portable physical medium such as a flexible disk (FD) that can be inserted into the computer 40, compact disk-read-only memory (CD-ROM), magneto-optic (MO) disk, digital versatile disk (DVD) disk, integrated circuit (IC) card, etc. Alternatively, they can be stored on a fixed physical medium such as a hard disk built into the computer 40 or an provided externally read by the computer 40 or on another computer (or server) connected to the computer 40 via a public circuit, Internet, local area network (LAN), or wide area network (WAN). The computer 40 can read and execute the programs from these mediums.

All the automatic processes explained in the present embodiment can be, entirely or in part, carried out manually. Similarly, all the manual processes explained in the present embodiment can be entirely or in part carried out automatically by a known method. The process procedures, the control procedures, specific names, and data, including various parameters, can be changed as required unless otherwise specified.

The constituent elements of the apparatus illustrated are merely conceptual and may not necessarily physically resemble the structures shown in the drawings. For instance, the apparatus need not necessarily have the structure that is illustrated. The apparatus as a whole or in parts can be broken down or integrated either functionally or physically in accordance with the load or how the device is to be used. The process functions performed by the apparatus are entirely or partially realized by the CPU or a program executed by the CPU or by a hardware using wired logic.

According to the present invention, cuts down the workload of the application developer every time an application written in a non-object-oriented language is deployed on an open platform, and the session management function is implemented as compared to the conventional method where the application developer must define an object for every server application.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable recording medium that stores therein a computer program that causes a computer to implement a method of sharing session management data between a plurality of requests made in one session by a client application to a server application written in a non-object-oriented language, the computer program causing the computer to execute:

creating a server instance associated with a thread shared with the server application when a request not yet recognized as belonging to a session is received, wherein a session identification data is affixed to the request so that the request is recognized as belonging to the session;

calling the server application that includes a first predetermined function and a second predetermined function from the server instance created, the first predetermined function being a function that sets the session management data in the shared thread and the second predetermined function being a function that retrieves the session management data from the shared thread;

keeping the session management data, set by the server application and retrieved from the shared thread, in a variable in the server instance when a process of the server application called ends;

setting the session management data, kept in the variable in the server instance corresponding to the session identification data, in the shared thread when the request containing the session identification data is received; and calling the server application from the server instance when the session management data is set in the shared thread;

wherein the computer-readable recording medium is a physical computer-readable recording medium.

2. The computer-readable recording medium according to claim 1, wherein the server instance created is associated with a thread-local area that functions as the thread shared with the server application.

3. A session management method of sharing session management data between a plurality of requests made in one session by a client application to a server application written in a non-object-oriented language, the method comprising:

creating a server instance associated with a thread shared with the server application when a request not yet recognized as belonging to a session is received, wherein a session identification data is affixed to the request so that the request is recognized as belonging to the session;

calling the server application that includes a first predetermined function and a second predetermined function from the server instance created, the first predetermined function being a function that sets the session management data in the shared thread and the second predetermined function being a function that retrieves the session management data from the shared thread;

keeping the session management data, set by the server application and retrieved from the shared thread, in a variable in the server instance when a process of the server application called ends;

setting the session management data, kept in the variable in the server instance corresponding to the session identification data, in the shared thread when the request containing the session identification data is received; and calling the server application from the server instance when the session management data is set in the shared thread;

wherein the session management method is implemented by a computer.

4. The computer-readable recording medium according to claim 1, wherein the shared session management data enables deployment of non-object oriented software applications from a non-open system to an open system.

5. The session management method according to claim 3, wherein the shared session management data enables deployment of non-object oriented software applications from a non-open computer system to an open computer system.

* * * * *